Figure 1:
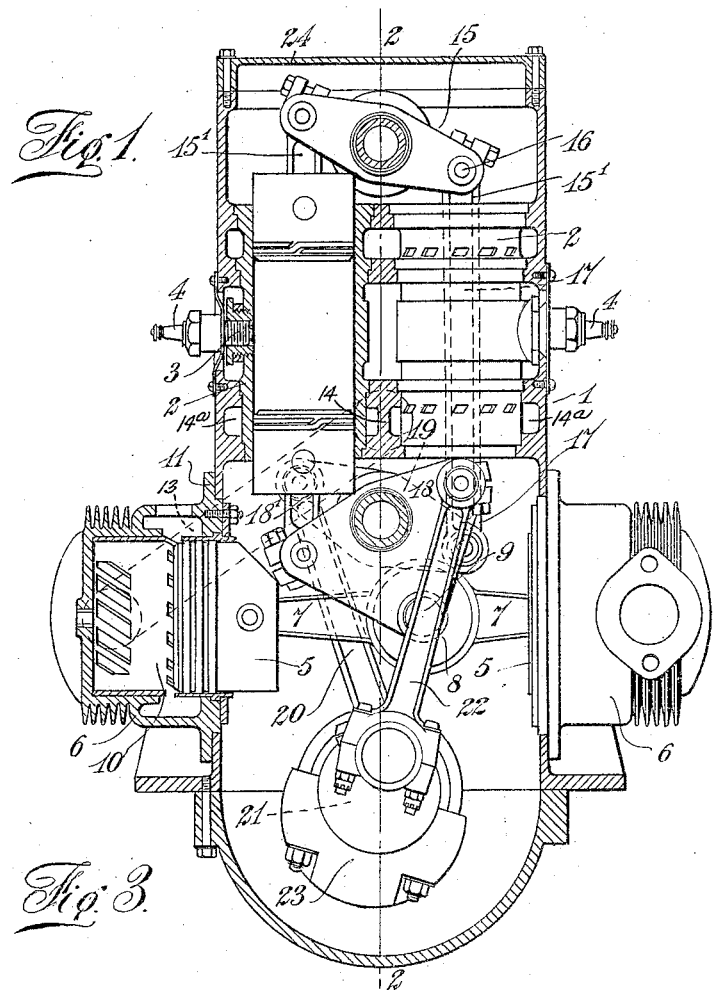

Dec. 13, 1932.    C. J. H. PENNING    1,890,794
INTERNAL COMBUSTION ENGINE OF THE OPPOSITELY MOVING PISTON TYPE
Filed Jan. 24, 1931    6 Sheets-Sheet 1

INVENTOR
C.J.H. PENNING
BY
ATTORNEY

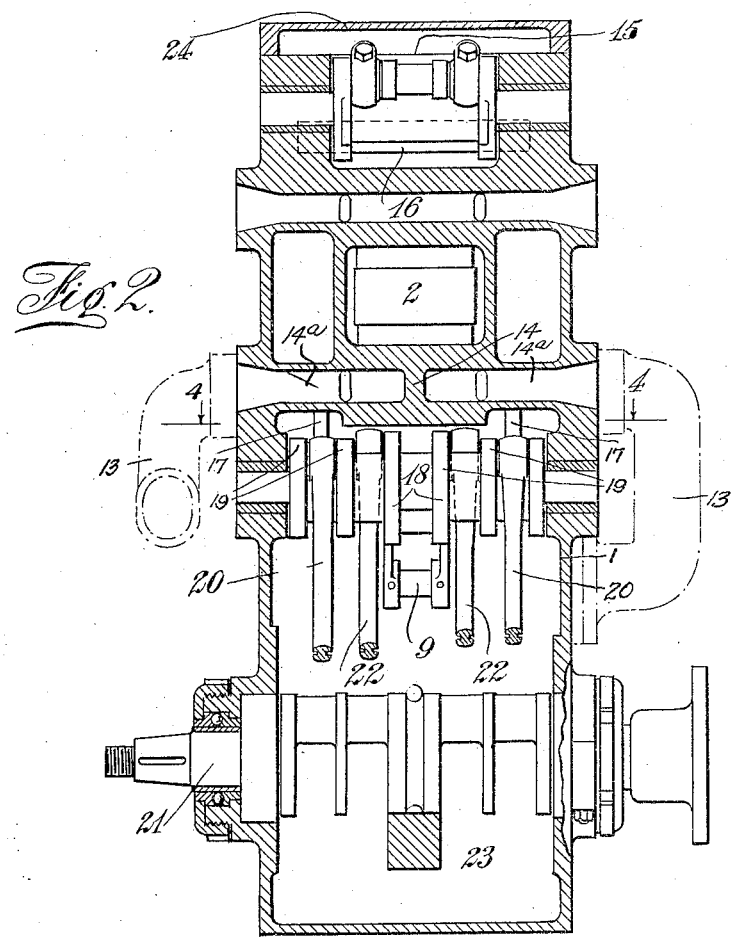
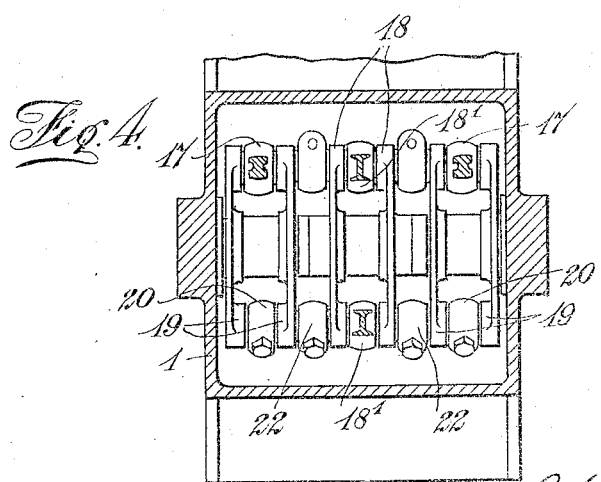

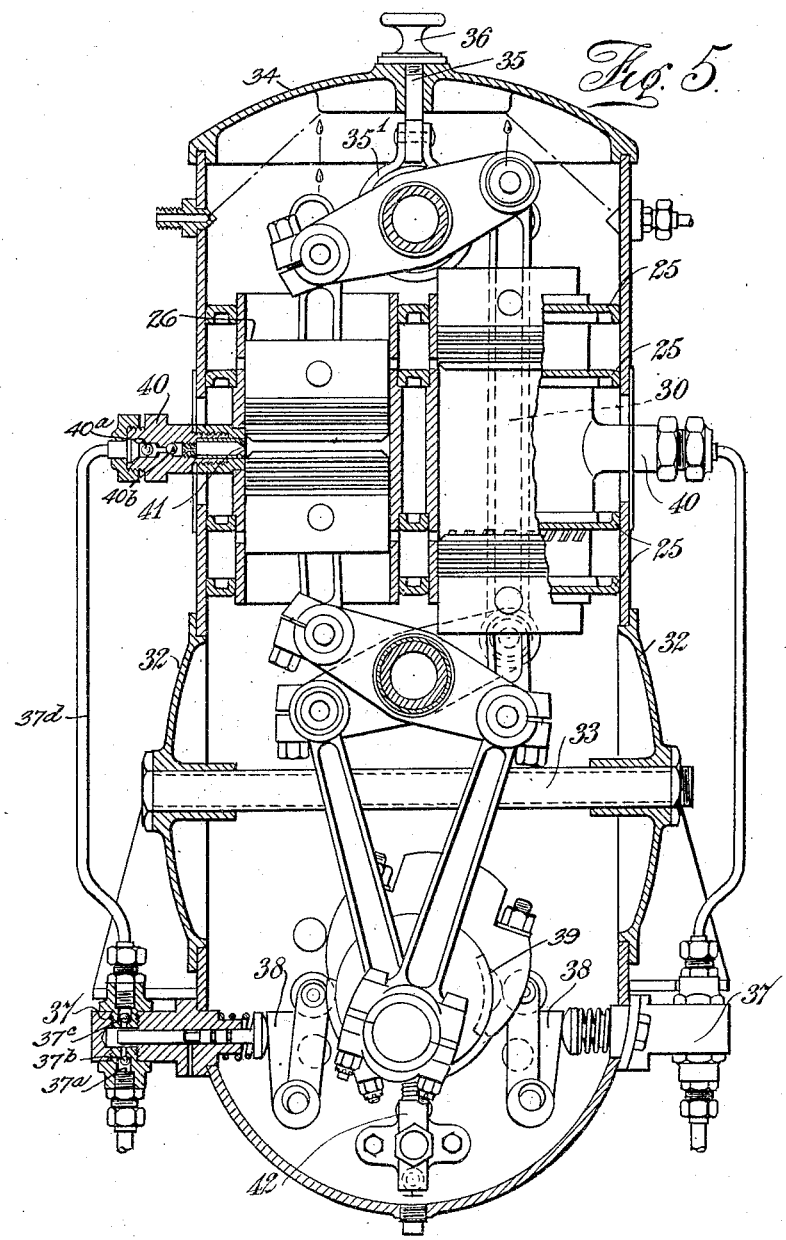

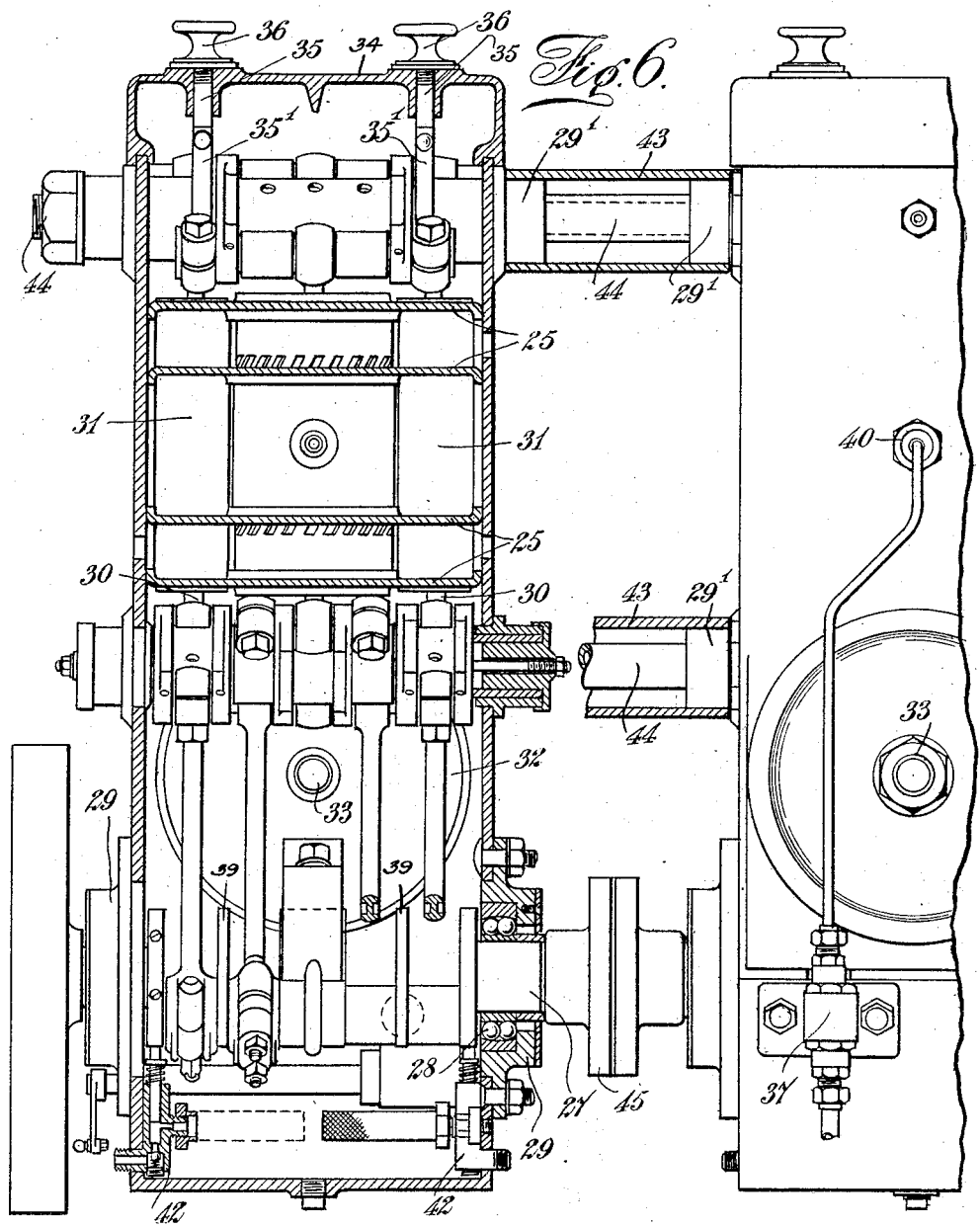

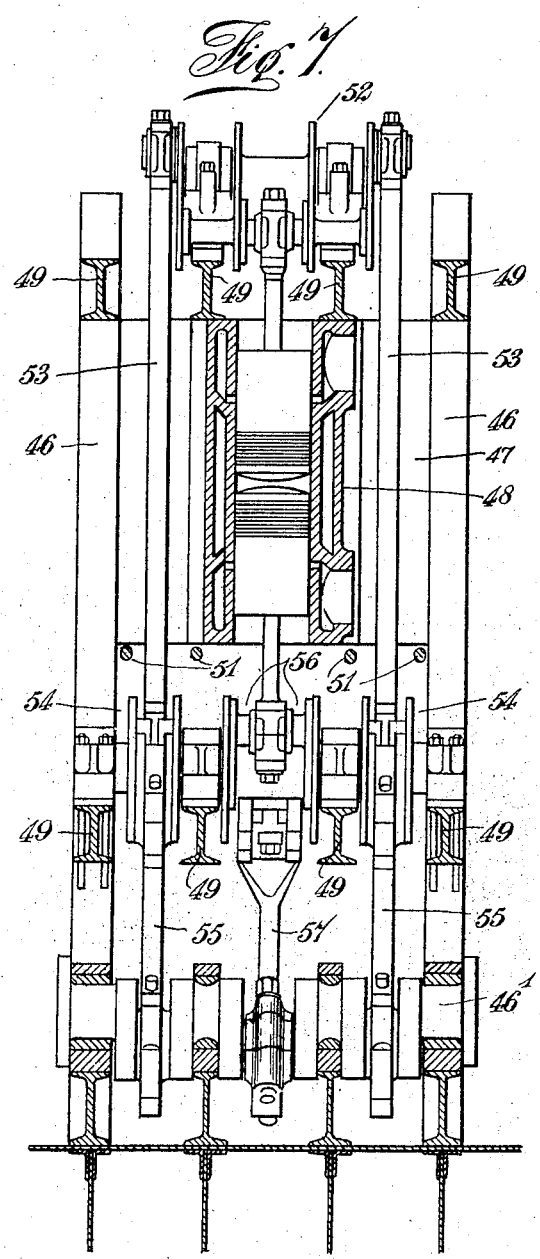

Dec. 13, 1932. C. J. H. PENNING 1,890,794
INTERNAL COMBUSTION ENGINE OF THE OPPOSITELY MOVING PISTON TYPE
Filed Jan. 24, 1931 6 Sheets-Sheet 6
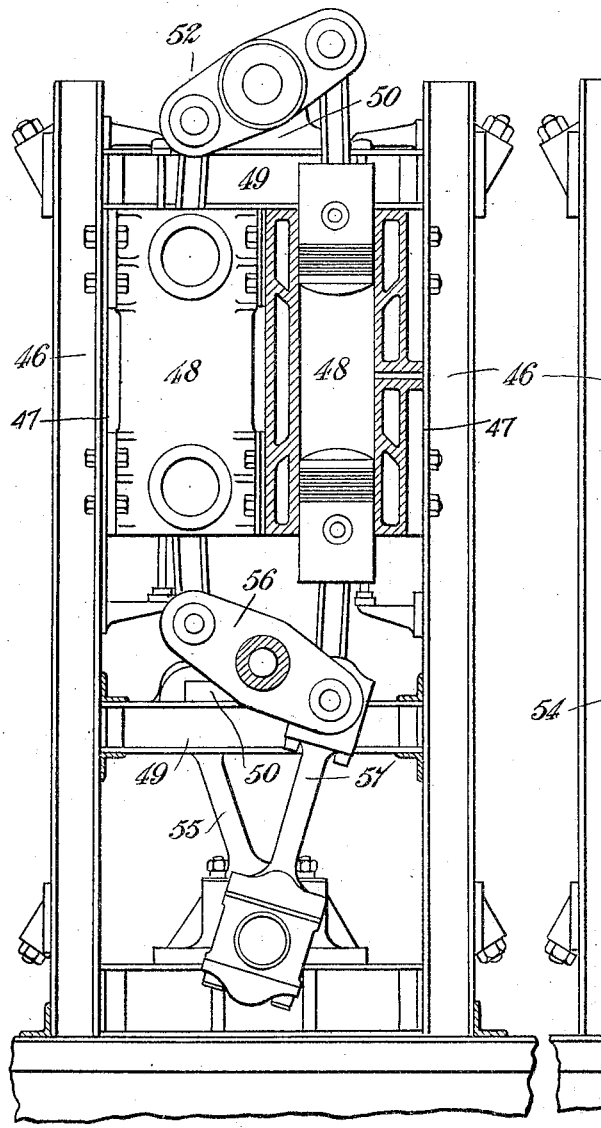
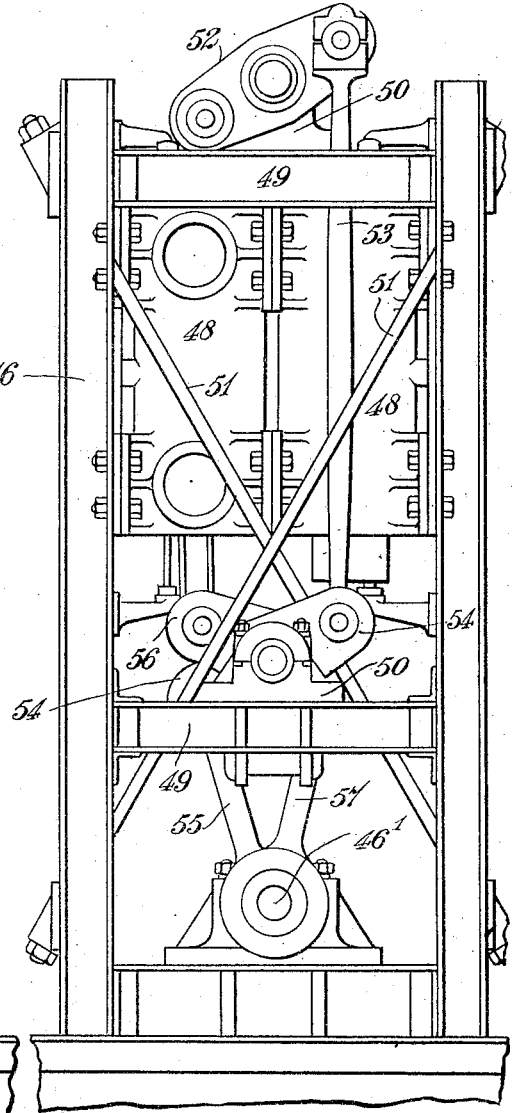
INVENTOR
C.J.H. PENNING
BY
ATTORNEY Patented Dec. 13, 1932

1,890,794

UNITED STATES PATENT OFFICE

CORNELIS JOANNES HUGO PENNING, OF VICTORIAS, NEGROS OCCIDENTAL, PHILIPPINE ISLANDS

INTERNAL COMBUSTION ENGINE OF THE OPPOSITELY-MOVING PISTON TYPE

Application filed January 24, 1931, Serial No. 511,025, and in Great Britain June 17, 1930.

This invention relates more particularly to internal combustion engines of the two-cycle type of the kind as described in the specification of Letters Patent No. 1,474,549 granted to me, and has for its chief object to provide an improved construction which renders the construction of light Diesel engines practicable and the building of large Diesel engines cheaper.

As heretofore, the engine comprises a pair, or more than one pair, of cylinders disposed parallel, each cylinder being provided with oppositely acting pistons connected to rocker arms, the movement of the rocker arms being transmitted therefrom to a crankshaft disposed between and below or to the side of the pair or pairs of cylinders.

The transmission of the rocker movement, according to the present invention, is transmitted from the bottom rocker to the crank pin through a connecting rod or rods connected to one of the gudgeon pins to which the piston connecting rods are fastened.

The movement of the top rocker is, according to this invention, transmitted through two or more connecting rods to the gudgeon pins of rockers or balances, the gudgeon pins on the other ends being connected by connecting rods to the same crankthrow of the crankshaft.

This will result in a state of balance being established between the side connecting rods and the crankshaft connecting rods.

The connecting rod or rods connecting the lower rocker to the crankshaft will not be balanced, but this can be taken care of by a balancing weight attached to the crankshaft or to the opposite end of the lower rocker.

Another object of this invention is to eliminate to the greatest possible extent the heavy castings which are a necessity in most types of internal combustion engines working on the Diesel principle.

In order to achieve this in small engines the frame or cylinder block may be built of aluminium with steel or cast iron liners or the cylinder block may be entirely built up from plate steel, from parts cut or pressed from steel plate, welded together electrically or by oxy-acetylene process, with supports for rocker or crankshaft bearings of steel, welded or bolted to the cylinder block.

In order to obtain lightness in large engines, the cylinders, rocker bearings and crankshaft bearings are preferably supported and bolted to a structural steel framework, stiffened by tension rods.

The bearings for the rocker shaft and crankshaft are bolted or riveted to the horizontal members of this structural steel framework whilst the cylinder castings are bolted or riveted to the vertical and horizontal members of the structural steel framework. The stresses will all be taken up in this framework and the connecting rods so that the cylinder castings can be considerably lightened, the cylinders only having to withstand the internal pressure.

In order that the said invention may be clearly understood and readily carried into effect, the same will now be described more fully, by way of example, with reference to the accompanying drawings, in which:—

Figure 3:
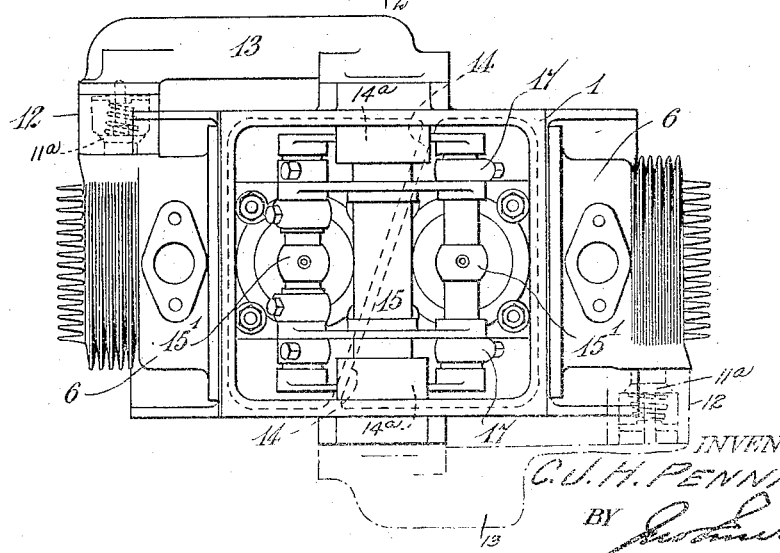

Figure 1 is a sectional front elevation of a small type of vertical internal combustion engine embodying the invention and comprising a single unit, the engine being a two-cycle supercharged double-acting unit with air-cooled cylinders, Figure 2 is a vertical sectional view taken approximately on the line 2—2, Figure 1, Figure 3 is a top plan view corresponding to Figure 1, with the top cover removed, Figure 4 is a horizontal section taken approximately on the line 4—4, Figure 2, Figure 5 is a similar view to Figure 1, on a slightly enlarged scale, showing a modified form of engine employing plate steel construction for a multiple unit, Figure 6 is a sectional side elevation thereof, Figure 7 is a sectional side elevation of a large type of Diesel engine embodying the invention, the engine being a double-acting unit with two cylinders, Figure 8 is a vertical sectional view taken at right angles to Figure 7, and Figure 9 is a front elevation.

Referring first more particularly to Figures 1 to 4, inclusive, there is shown a small type of vertical internal combustion engine comprising a single unit, the engine being a two-cycle supercharged double-acting unit with air-cooled superchargers. The unit has preferably a cast aluminium housing 1 in which stepped cast iron cylinder liners 2 may be kept by bolts holding on to the top flange of the said liners. Suitable fittings, such as denoted at 3, are screwed into the centre of the liners for the location of the spark plugs 4. The pistons 5 of two supercharging cylinders 6 are driven by a double connecting rod 7, in which a sliding block 8 is located, from a gudgeon pin 9, fastened in the extended lower centre rocker hereinafter referred to. The supercharger cylinders 6 are preferably of cast aluminium with cast iron liners 10. They draw in at the end of the inward stroke from a carburetor fastened to a flange 11 and discharge on the outward stroke through a light spring-loaded valve 11a located within a casing 12, and a tube 13, to one side of the scavenge chamber in the housing 1. The scavenge chamber is divided by a diagonal wall 14 into two parts or compartments 14a separating the scavenge ports of the two engine cylinders. The other supercharger discharges into the other compartment of the supercharging space. The piston action and port control is similar to that described in the said specification, the top pistons uncovering the exhaust ports before the lower pistons uncover the scavenge ports in the lower and opposite part of the cylinder and also closing the exhaust ports before the scavenge ports have been covered by the lower pistons thereby allowing the new charge to be compressed by the supercharger in the working cylinder before compression between the working pistons begins.

The top rocker 15, which is connected centrally to the top pistons of the engine by means of rods 15', has also connected to the elongated gudgeon pin 16 thereof side rods 17, passing through openings in the housing 1 to the crankcase, in which the lower centre rocker 18 and side rockers 19 are located, the lower centre rocker being connected by means of rods 18' with the lower pistons of the engine.

The side rods 17 are connected to one side of the side rockers 19, the opposite side of the said rockers being connected by rods 20 to the same crankthrow of a single throw crankshaft 21 which is preferably supported in ball bearings. The lower centre rocker 18 has at one side an elongated gudgeon pin to which two rods 22 are connected, the said rods being also connected to the crankshaft 21. A balancing weight 23 is provided to counter-balance the weight of the two centre connecting rods 22.

To gain entrance to the cylinders it is only necessary to remove the top cover 24, disconnect the side connecting rods 17 from the top rocker, by driving out the gudgeon pin 16, after which the top rocker shaft can be drawn out and the top rocker with the two top pistons lifted out.

In the construction of internal combustion engine shown in Figures 5 and 6, employing plate steel construction for a multiple unit, the engine being adapted to use heavy oil fuel and compression ignition, the main body is made of plate steel with dished partitions 25 through which steel cylinder liners 26 pass. After assembly, these parts can be welded together by oxy-acetylene or electric welding process. The crank shaft 27 is rotatable in ball bearings 28 supported in cast aluminium or steel housings 29, bolted to the steel plate cylinder block, steel stumps 29' to carry the upper and lower rocker shafts being also welded to this cylinder block, the said rocker shafts and rods connected therewith being arranged substantially in the manner above described with reference to Figures 1 to 4. The side rods in this construction associated with the top rocker shaft and denoted at 30, pass through steel tubes 31 rolled in suitable holes left in the steel dished partitions 25.

A rotary supercharger may be used, discharging through a suitable manifold in the lower scavenging compartment.

Access to the crankshaft and the lower rockers can be obtained by removing circular cast aluminium or pressed steel and covers 32 held in place, for instance, by a central tube bolt 33. Access to the top rocker can be obtained by removing a cast aluminium or pressed steel cover 34 held in place as by means of bolts 35 provided with knob nuts 36, the bolts being shown connected to members 35' surrounding the top rocker shaft.

The fuel pumps 37 comprise an inlet pipe 37a with which co-operates a ball valve 37b to prevent return of the liquid fuel on the discharge stroke of the pump plunger, the fuel then passing through the seat controlled by a ball valve 37c, it being understood that the ball valve 37b is arranged so as not to obstruct the passage of the fuel during the suction stroke to the pump barrel and that the ball valve 37c is similarly arranged so that no obstruction is offered to the flow of the fuel when being discharged through the pipe connection 37d to the injection chamber 40. This chamber 40 is provided with a non-return inlet ball valve 40a adapted to permit the fuel to be supplied to the chamber 40 and thence by way of a non-return ball valve 40b to the injection nozzle 41, it being understood that the valve 40a would not interfere with the passage of the fuel through the seat with which the valve 40b co-operates and that the valve 40b would not interfere with the free passage of the fuel to the nozzle 41. These fuel pumps 37 are actuated through adjustable wedges 38 direct from cams 39 on the crank shafts. The said cams also actuate oil pumps 42.

To connect two of these units, steel sleeves 43 are used as distance pieces fitting over the stumps 29' supporting the rocker shafts, and relatively long through going bolts 44 passing through the rocker shafts hold the units together. The crank shafts are coupled by flange couplings 45, between which a flywheel could be bolted or secured, if desired.

In the construction of large type of vertical Diesel engine shown in Figures 7, 8 and 9, with a structural steel framing, the steel frame consists of vertical members 46 connected in the direction of the crankshaft 46' by steel plates 47 to which the cylinder castings 48 are bolted or riveted and by steel angle irons. Cross members 49 connect the vertical members and form supports for the rocker bearings 50. The steel structure is furthermore stiffened by tension rods 51.

The top rockers 52 are connected by side rods 53 to one end of the lower side rockers 54 and rods 55 are connected to the other end of the said side rockers and to the crankshaft. The lower centre rocker 56 is connected to the crank shaft by means of a rod 57. The crank shaft with three crank throws in the same centre is supported in bearings fastened to lower members of the steel framework.

What I claim is:—

1. In a reciprocating engine having a pair of parallel cylinders, with opposed pistons in each cylinder and a crank at one end of said cylinders, means associating said pistons with said crank comprising rockers at each end of said cylinders, the pistons at the end remote from the crank connected to opposite ends of an adjacent rocker, connecting rods connecting the opposite ends of said rocker to ends of rockers adjacent the crank; the pistons adjacent the crank connected to opposite ends of another adjacent rocker, and connecting rods of equal length connecting all said rockers adjacent the crank to said crank.

2. An engine according to claim 1 having the rockers supported on shafts fastened in a closed housing containing cylinders, piston gear and crankshaft.

3. An engine according to claim 1 in which the structure specified is secured in a closed housing including a diagonal wall providing a scavenge chamber consisting of two isolated compartments, one for each cylinder.

4. An engine according to claim 1 in which the structure specified is secured in a closed housing including a diagonal wall providing a scavenge chamber consisting of two isolated compartments, one for each engine, with two scavenge pumps driven from one of said rockers, the discharge of said pumps being connected by suitable piping to said compartments respectively.

5. In a reciprocating engine having a pair of parallel cylinders with oppositely disposed pistons in each cylinder and a crank at one end of said cylinders, rockers at each end of said cylinder, the rocker adjacent the crank connected directly thereto by a connecting rod, the rocker remote from the crank connected indirectly to the crank through an idler rocker coaxial with the first mentioned adjacent rocker, said crank and remote rocker being connected to opposite ends of said idler rocker by connecting rods, the remote pistons connected to opposite ends of the remote rocker and the pistons adjacent the crank connected to opposite ends of the adjacent rocker.

In testimony whereof I have hereunto signed my name.

C. J. H. PENNING.